United States Patent [19]

Van Vlaenderen

[11] 4,416,326
[45] Nov. 22, 1983

[54] APPARATUS FOR MELTING REFRIGERATED BUTTER

[75] Inventor: Johannes M. H. Van Vlaenderen, Amstelveen, Netherlands

[73] Assignee: Alfa-Laval N.V., Amstelveen, Netherlands

[21] Appl. No.: 335,096

[22] Filed: Dec. 28, 1981

[30] Foreign Application Priority Data

Dec. 29, 1980 [EP] European Pat. Off. ........ 80201237.7

[51] Int. Cl.³ .............................................. F28F 13/00
[52] U.S. Cl. ........................... 165/120; 126/343.5 A; 165/135; 222/146 H; 222/146 HS
[58] Field of Search ................. 126/343.5 R, 343.5 A; 165/120, 135; 222/146 H, 146 HS, 146 HE; 219/421

[56] References Cited

U.S. PATENT DOCUMENTS

| | | | |
|---|---|---|---|
| 2,809,772 | 10/1957 | Weisz | 222/146 HE |
| 3,080,863 | 3/1963 | Stolle | 126/343.5 A |
| 3,282,469 | 11/1966 | Skonberg | 222/146 HE |
| 3,399,426 | 9/1968 | Weasel, Jr. | 126/343.5 A |
| 3,788,392 | 1/1974 | Abbott et al. | 165/135 X |
| 4,195,755 | 4/1980 | Slautterback et al. | 222/146 HE |

FOREIGN PATENT DOCUMENTS 421857 11/1923 Fed. Rep. of Germany ... 126/343.5 A

*Primary Examiner*—Sheldon J. Richter
*Attorney, Agent, or Firm*—Becker & Becker, Inc.

[57] ABSTRACT

An apparatus for melting refrigerated butter, cream, or similar substances. A block of butter to be melted is forced by a mechanically energized punch through a grating. This grating includes heated tubes that are substantially triangular in transverse section. The block of butter is faced by angular top edges of the tubes. The wall of the grating tubes facing away from the block of butter is preferably furnished with a heat barrier, the angular edges of this wall being as sharp-cornered as possible and preferably equipped with aprons which are at least substantially perpendicular to the plane of the grating.

9 Claims, 7 Drawing Figures

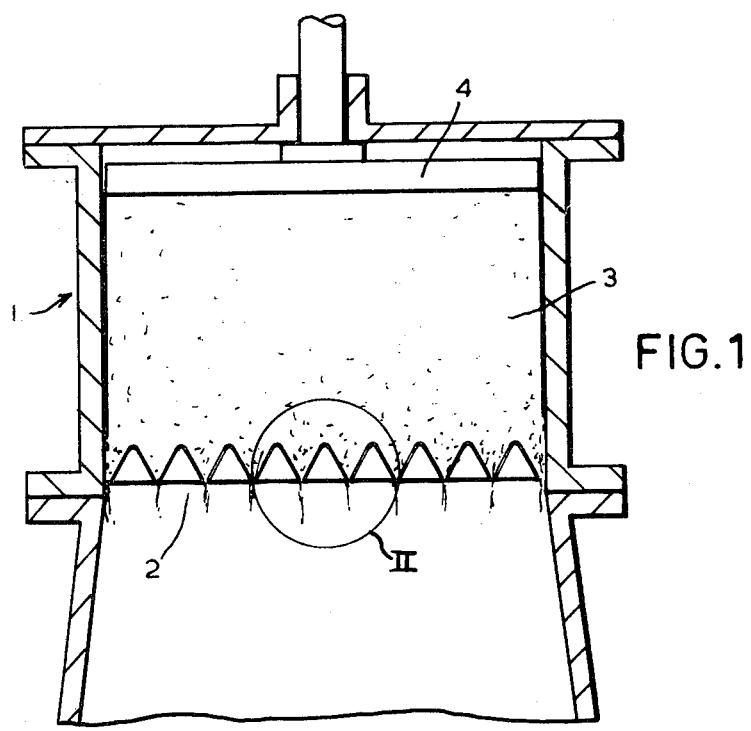
FIG.1
FIG.2
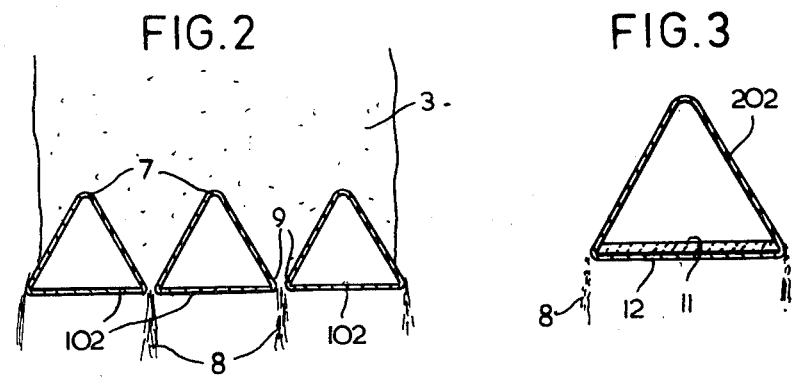
FIG.3
FIG.4
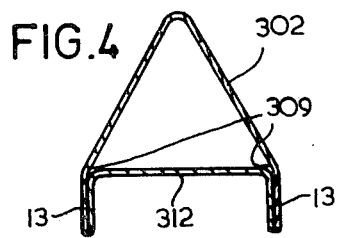

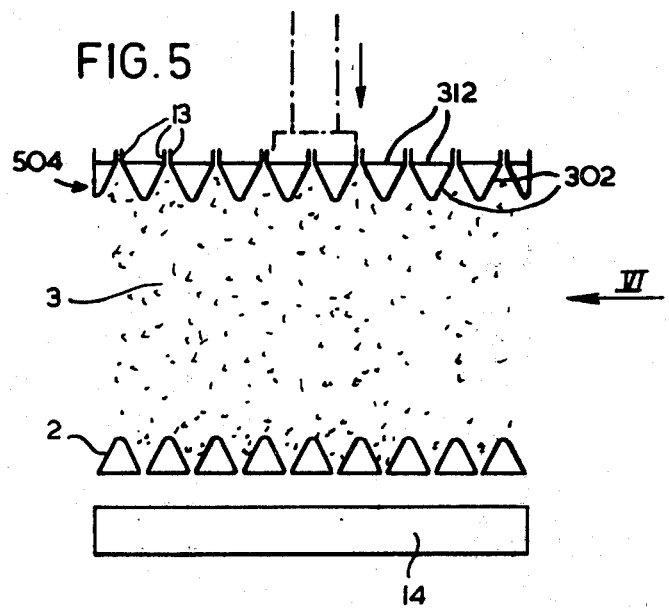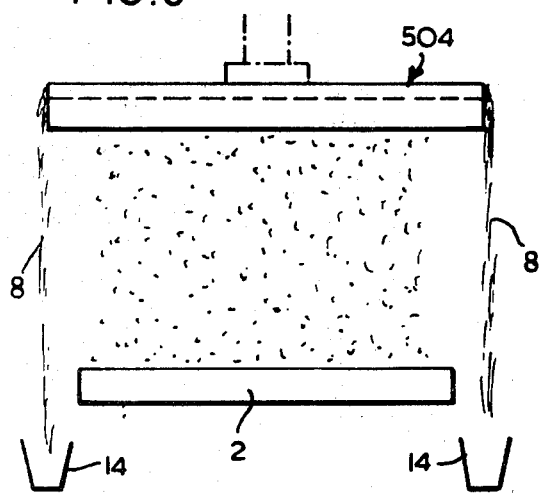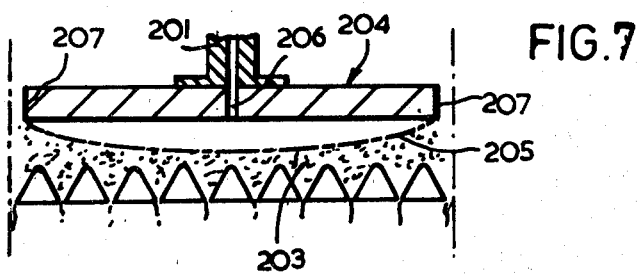

APPARATUS FOR MELTING REFRIGERATED BUTTER

The present invention relates to an apparatus for melting refrigerated butter, cream, or similar substances, with a block of the substance to be melted being pressed against a grating which lies in a horizontal plane and comprises tubes through which hot liquid or vapor is forced in such a way that the substance to be melted passes into the molten state as a result of contact with the heated tubes, and then substance in molten state can be discharged in liquid form through the grating.

In prior-art embodiments of this type of apparatus, the block of butter which rests on the grating is pressed onto this grating solely under the force of its own mass. Accordingly, the butter melts off only in a slow manner, causing the retention time of the molten layer which develops between the gradually shrinking block of butter and the heated tube walls to be unduly long, so that scorching of the melt is a frequent occurrence. This makes it necessary to limit the amount of heat supplied to the tubes, which entails a restriction of the production of molten butter per unit time.

It is an object of the present invention to provide a melting apparatus of the aforementioned type which does not have the drawback stated, and thus has a higher production capacity per unit time, yet does not require a larger area of floor space.

This object, and other objects and advantages of the present invention, will appear more clearly from the following specification in connection with the accompanying drawings, in which:

FIG. 1 is a diagrammatic sectional view of part of one embodiment of the apparatus of the present invention;

FIG. 2 shows on an enlarged scale the part marked II in FIG. 1;

FIG. 3 is a sectional view of a grating tube provided with a heat barrier;

FIG. 4 is a sectional view of the grating tube according to a variant embodiment;

FIG. 5 is a diagrammatic sectional view of a variant embodiment of the apparatus, with the punch also being designed as a grating for the melting process;

FIG. 6 is a diagrammatic view taken in the direction of the arrow VI in FIG. 5; and FIG. 7 is a view of a punch which is furnished with an inflatable wall.

The melting apparatus according to the present invention is characterized primarily by being equipped with mechanically energized punching means which press the block of butter to be melted with additional force through the grating. This allows the layer of molten butter between the block and the heated tubes to flow off more rapidly, which layer is at the same time thinned down. This, first of all, reduces the retention time in that area, thus diminishing the change of scorching, and secondly the heat transfer is improved because of the smaller layer thickness. This results in an increased amount of molten butter per unit time, which is further promoted by the higher tube temperatures that may be selected in view of the reduced risk of scorching.

Another drawback of the prior-art embodiments of melting apparatus is that the molten butter, while dripping off along the part of the wall facing away from the block of butter, continues to be exposed to heat from the heated tube, so that scorching can take place in that area as well. Although the extent to which this happens is already reduced when additional force is applied to the block of butter, causing the passage of the melt to be accelerated, as described hereinabove, this risk of scorching can be still further reduced according to a further development of the present invention, which provides a heat barrier to be applied to the aforementioned part of the tube wall, so that a reduced amount of heat is transmitted to the molten butter in this area. This measure creates another possibility for selecting a higher temperature for the tubes, which in turn results in an increased production per unit time. Such a heat barrier can efficiently comprise a strip of thermally insulating material which is applied to the inside of the aforementioned part of the wall.

Furthermore, in order to reduce the retention time of the molten butter at the tube or in the vicinity thereof, the dripping process is promoted according to a further feature of the present invention by providing both sides of that part of the tube wall which faces away from the block of butter to be melted with sharp edges extending in the longitudinal direction. These edges are preferably formed by aprons which extend along the tube and are at least substantially perpendicular to the tubular grating, and which act as dripping baffles.

Optimum results are obtained from the aforementioned measures by selecting tubes which have an at least substantially triangular shape in transverse section. With such a design, the block to be melted is faced by one angular edge which, when viewed in cross section, may have a moderate fillet radius. Such an angular edge results in a higher specific surface pressure of the butter upon the upper side of the tube, so that the molten layer flows out all the more easily between the unmelted butter and the tube wall. The other two angular edges can be easily manufactured in a sharp-cornered shape because of the triangular transverse section of the tube, so that sharp edges as described hereinabove are available without special measures having to be taken.

The punching means comprises a punch plate which presses upon the block of butter, to which it must not be allowed to stick at the end of each impact stroke. In order to prevent such adhesion and to obtain a reliable separation of the punch plate from the butter, that face of the punch plate which faces the block of butter may according to the invention comprise an inflatable wall, which may consist of a rubber plate that is hermetically secured on the edges of the punch plate, inflation being accomplished through a hollow bearing rod of the punch plate.

The present invention can also be used with punching means having a tubular grating, so that the block of butter is caused to melt at both ends simultaneously.

FIG. 1 shows the frame 1 of the inventive melting apparatus, the tubular grating 2 which is rigidly attached to the frame, a refrigerated block of butter 3 which must be melted, and a punch 4 which can move up and down and is operated with power means that are not shown. A heating medium, such as water at a temperature of 105° centigrade, is pumped in a known manner through the tubular grating 2. At the same time, the punch 4 is energized so as to force the block 3 through the tubular grating.

FIG. 2 is a more detailed view of the progress of the melting process. The block of butter 3 is forced between the tubes, with the butter being liquefied between the walls of the tubes 102 and the block of butter 3. Because of the relatively tapered shape of the tops 7 of the substantially triangular tubes 102, the liquid butter is discharged rapidly and drips in an unbroken flow 8 from the sharp-cornered lower edges 9.

FIG. 3 shows a tube 202 according to the invention, which is provided with an insulating strip 11 for the purpose of obtaining a heat barrier. As a result, the wall 12 transmits less heat to the butter 8 which is dripping down, thus reducing the risk of scorching. This also allows the temperature of the heating medium to be raised to a higher value than would have been possible without a heat barrier, so that an increased production can be achieved.

FIG. 4 shows a tube 302 which is provided with aprons 13 which form projecting walls along the angular edges 309. These aprons 13 enhance the dripping process of the molten butter; the lower wall 312 naturally can be provided additionally with the heat barrier shown in FIG. 3.

FIGS. 5 and 6 are diagrammatic views of a variant of the invention, according to which the punching function (of the punch 4 in FIG. 1) is performed by a tubular grating 504 which is composed of tubes 302, as shown in FIG. 4. This causes the butter to melt at the upper end of the block as well, which results in the output being doubled. The butter which has melted at the top flows off along the conduit formed by the wall 312 and the aprons 13 (FIG. 4), and drips off at the ends of the tubes 302, which must have a sufficient length for this purpose. The molten butter is conveyed further through chutes 14.

FIG. 7 shows a variant embodiment 204 of the punch. The punch plate 204 is covered with a flexible facing plate 205, for instance of rubber, which is hermetically sealed at the edges 207 around the plate 204. The punch plate 204 is attached to a hollow punch rod 201, the punch plate 204 being provided with an opening 206 that connects to the hollow rod 201. In the situation shown, the block of butter 203 has melted down so far that the input of a new charge is required. During the operation of withdrawing the punch plate 204 by means of the punch rod 201, air is simultaneously blown through the hollow rod, causing the facing plate 205 to bulge, as indicated by the dash-dot line in FIG. 7. This also prevents the butter from sticking to the punch plate 204.

The hollow punch rod 201 can also be used for cleaning the apparatus by fitting the punch plate 204 thereto in such a manner that it can be readily removed, whereupon a cleaning liquid is discharged in a forceful stream through a sprayer (not shown) which is connected to the hollow punch rod 201.

The present invention is, of course, in no way restricted to the specific disclosure of the specification and drawings, but also encompasses any modifications within the scope of the appended claims. For example, it is possible to vary the substantially triangular cross section of the tubes, and the top parts 7 thereof may be more rounded or more acute than is indicated in the drawings.

What I claim is:

1. An apparatus for melting a refrigerated substance, said apparatus comprising:
   a frame;
   a grating rigidly attached to said frame in a substantially horizontal plane, and comprising a plurality of tubes which are adapted to receive a hot medium therethrough; and
   a mechanically energized punching means displaceably associated relative to said frame for pressing a block of said substance which is to be melted against and through said grating, said substance passing into a molten state as a result of contact with said hot tubes, and being discharged in liquid form through said grating, said tubes of said grating being provided with walls, that wall portion of a given tube facing away from said block of substance to be melted being provided with a heat barrier.

2. An apparatus according to claim 1, in which said heat barrier comprises a strip of thermally insulating material which is applied to the inside of said wall portion.

3. An apparatus according to claim 1, in which both ends of said wall portion are provided with sharp edges.

4. An apparatus according to claim 3, in which said sharp edges are formed by aprons which extend along said tubes and are at least substantially perpendicular to said tubular grating.

5. An apparatus according to claim 1, in which said tubes have a substantially triangular shape in transverse section.

6. An apparatus according to claim 1, in which said punching means comprises a grating of tubes adapted to receive a hot medium therethrough.

7. An apparatus according to claim 1, in which said punching means includes a surface which faces said block of substance to be melted, said surface being provided with an inflatable covering.

8. An apparatus for melting a refrigerated substance, said apparatus comprising:
   a frame;
   a grating rigidly attached to said frame in a substantially horizontal plane, and comprising a plurality of tubes which are adapted to receive a hot medium therethrough; and
   a mechanically energized punching means displaceably associated relative to said frame for pressing a block of said substance which is to be melted against and through said grating, said substance passing into a molten state as a result of contact with said hot tubes, and being discharged in liquid form through said grating, said punching means including a surface which faces said block of substance to be melted, said surface being provided with an inflatable covering.

9. An apparatus according to claim 8, in which said punching means comprises a grating of tubes adapted to receive a hot medium therethrough.

* * * * *